United States Patent
Hartley et al.

(10) Patent No.: US 6,365,681 B1
(45) Date of Patent: Apr. 2, 2002

(54) PREVENTING UPSETS IN POLYMERIZATION REACTORS

(75) Inventors: Ivan Jeremy Hartley, St. Albans; John Roberts Parrish, Cross Lanes; Paul Kevin Samples, Scott Depot, all of WV (US); Darrell James Long, Destrehan, LA (US)

(73) Assignee: Union Carbide Chemicals & Plastics Technology Corporation, Danburry, CT (US)

( * ) Notice: Subject to any disclaimer, the term of this patent is extended or adjusted under 35 U.S.C. 154(b) by 0 days.

(21) Appl. No.: 09/761,039

(22) Filed: Jan. 16, 2001

(51) Int. Cl.[7] .................................................. C08F 2/40
(52) U.S. Cl. ............................. 526/61; 526/59; 526/82; 526/84; 526/901
(58) Field of Search ............................... 526/59, 61, 82, 526/84, 901

(56) References Cited

U.S. PATENT DOCUMENTS

| | | | |
|---|---|---|---|
| 3,902,515 A | 9/1975 | Douglas et al. | 137/68 |
| 4,027,085 A | 5/1977 | Clemmer et al. | 526/61 |
| 4,306,044 A | 12/1981 | Charsley | 526/84 |
| 4,431,855 A | 2/1984 | Reusser et al. | 585/360 V |
| 4,525,546 A | 6/1985 | Fukawa et al. | 526/68 |
| 4,649,128 A | 3/1987 | Rekers et al. | 502/109 |
| 4,786,695 A | 11/1988 | Cook et al. | 526/84 |
| 4,834,947 A | 5/1989 | Cook et al. | 422/117 |
| 5,066,736 A | 11/1991 | Dumain et al. | 526/82 |
| 5,200,502 A * | 4/1993 | Kao et al. | 526/84 X |
| 5,270,408 A * | 12/1993 | Craddock, III et al. | 526/84 X |
| 5,336,738 A | 8/1994 | Havas et al. | 526/82 |
| 5,432,242 A | 7/1995 | Baron | 526/68 |
| 5,990,250 A | 11/1999 | Parrish et al. | 526/61 |

* cited by examiner

*Primary Examiner*—Fred Teskin

(57) ABSTRACT

In a polymerization reaction, an upset is anticipated and inhibited by monitoring at least one reaction condition and comparing it to the desired value or normal range for the condition as projected by a computer model for the variable or variables of the process. In a preferred variation, the process not only continuously adjusts the set point or range for an upset-significant variable such as temperature, but also utilizes the rate of change of such a variable as a harbinger of an upset.

20 Claims, 4 Drawing Sheets

PREVENTING UPSETS IN POLYMERIZATION REACTORS

TECHNICAL FIELD

This invention relates to the manufacture of olefin polymers in fluidized beds, particularly to the monitoring and anticipation of conditions likely to result in upsets or runaway reactions which might necessitate a shutdown, and to corrective action to prevent such upsets or runaway reactions.

BACKGROUND OF THE INVENTION

In a highly competitive market, olefin polymerization reaction systems are pushed ever closer to their operating constraints in order to increase production in existing equipment. Operating close to the constraints, the possibility of a reactor upset becomes greater. For purposes of this invention, an upset is a reaction which exceeds normal operating constraints to a degree which requires a rapid reduction in production rate to prevent a significant economic loss by way of a shutdown, production of unusable product, loss of raw material, or the like. Our invention seeks to identify an incipient upset which would otherwise require a shutdown or other drastic or unusual operating action unless an effective amount of polymerization retarding agent is introduced imminently. Typically an upset could involve a significant increase in temperature in the reacting system, which may escalate the reaction further out of control and/or dangerously soften the product particles, causing them to stick together and form large unmanageable agglomerates. Unusual pressure values, superficial gas velocities, or static effects can also be harbingers of upsets, although not as common or always as dependable as temperatures. Upsets can also be the result of influences that are not measured or predicted, such as variations in reactant feed quality, irregular catalyst flow(s), and equipment malfunction. To maintain reactor operation and avoid expensive shutdowns, polymerization retarders can be fed into the reactor during or following an upset once it is detected, but manual intervention to introduce fast acting polymerization retardants may often not be timely enough or accurate enough to avoid the adverse consequences of major process upsets. Human monitoring cannot be expected to suffice where combinations of rapidly changing variables must be interpreted to anticipate runaway conditions.

Fast acting mechanisms to retard polymerization rates are well known and may include carbon monoxide and other catalyst poisons. See EP 0,376,559 for examples of catalyst poisons and polymerization rate retarders. U.S. Pat. No. 4,306,044 proposes the use of $CO_2$ to quench or retard a polymerization system when the reaction temperature reaches an unacceptable level. U.S. Pat. Nos. 4,834,947, 4,786,695, 4,431,855, 5,336,738, 4,786,695 and European Patent EP-471 497 B1 describe the introduction of activity retarders for terminating the reaction under emergency conditions to maintain the temperature in the reactor below the sintering temperature of the polymer. These emergency conditions are typically equipment failures whereby the heat generated from the exothermic polymerization reaction cannot be removed from the process, resulting in sintering of the resin bed. An activity retardant is introduced to the reaction system to completely terminate the reaction mechanism. U.S. Pat. Nos. 5,066,736 (EP 359 444) and 5,432,242 describe processes in which a very small amount of activity retarder is continuously introduced into a reactor at a flow rate which is varied in time so as to maintain a substantially constant polymerization rate. This more or less constant feeding of activity retarder prevents the achievement of maximum catalyst productivity and therefore increases productivity costs in the reactor and also tends to degrade product quality. In addition, the polymerization rate alone may not correlate with temperature excursions above the sintering temperature of the polymerized bed and many other typical process anomalies. Further, disruptions which can result in a reactor shutdown often do not affect production rate measurements in a manner timely enough to take appropriate action.

SUMMARY OF THE INVENTION

A novel process has been developed which provides early detection and identification of events likely to lead to upsets and automatically introduces a prescribed amount of polymerization retardant delivered over a prescribed period of time to keep the process within the operating envelope. The following generalized steps comprise the invention: (a) continuously, periodically or intermittently monitoring at least one condition in the system, the condition being useful as a harbinger of an incipient upset (b) continuously, periodically or intermittently comparing the monitored condition to a critical level thereof for the manufacture of the resin product beyond which an upset is likely, the critical level being determined continuously, periodically or intermittently by a model based on knowledge of the polymerization reaction system (c) upon determining that the condition exceeds the critical level, determining an amount and duration therefore for feeding retarding agent to said reaction system for the catalyst to return the condition to below the critical level, and (d) delivering the retarding agent into the reactor.

The invention includes the further optional steps of (e) continuously, periodically or intermittently monitoring the effects of the corrective action as it proceeds, (f) modifying the corrective action (retarder feed) to maintain prescribed operating conditions as the system reacts to the presence of retarder, (g) terminating the retarder feed when it is no longer needed, as determined at least partly by current inputs and (h) adjusting one or more process variables to compensate for long term effects of the presence of the retarder in the reactor and/or the reduced polymerization rate already effected. In addition to these further designated steps e-h, one must, in preparation, establish a computer model of the process capable of determining the likelihood that various combinations of values of the monitored and model variables will lead to an upset condition within the time frame of interest. The computer model is an embodiment of a priori knowledge which reflects the dynamic relationship between process measurements and a potential process upset; it comprises one or more algorithms periodically executed using real time process measurement or data.

This invention entails a novel automated process including introducing a measured quantity of polymerization retardant to a reaction system at a feed rate based on at least one process measurement or inferred variable and a comparison of that measurement or inferred variable to an acceptable range for that process measurement in a computer model for the polymerization process in use and under at least one other monitored prevailing condition. The process measurement(s) may include monitored reaction temperatures, electrostatic charge, and resin flowability. Comparisons may be based on a priori process knowledge such as sintering temperature of the polymer, tolerable electrostatic charge intensity and duration, resin density limits, and other factors derived from experience with the process and the product being made. The computer model will reflect historical experience preferably for at least two process control variables, including a variable to be controlled in the process, and an acceptable range or critical level for the controlled variable is preferably varied continuously or intermittently by monitoring and entering at least two model input variables as the process continues. Current practices require manual observation of process upsets and a manual initiation of a polymerization retardant. By using a fast acting automated controlled effort, dynamically responsive to ongoing and current variations in the system, major process upsets can be attenuated or avoided, resulting in a more consistent, improved product quality and increased production throughput.

It will be seen that our invention is a method of inhibiting the maturation of incipient upsets in a polymerization reaction system making a particulate polyolefin resin product in the presence of a polymerization catalyst, comprising (a) continuously, intermittently, or periodically monitoring at least one condition in the system, the condition being useful as a harbinger of an incipient upset (b) continuously, intermittently or periodically comparing the monitored condition to a critical level thereof for the manufacture of the resin product beyond which an upset is likely, (c) upon determining that the condition exceeds the critical level, determining an amount and feed rate duration therefore of retarding agent for the catalyst to return the condition to below the maximum, and (d) delivering the dose of retarding agent into the reactor. As a follow-up step, the level of catalyst feed may be reduced by at least 2% below its level at the beginning of step (c). At least one monitored condition may be a rate of increase of temperature monitored at a given point or points in the reactor. Thus our invention includes a method of inhibiting an imminent upset in a fluidized bed olefin polymerization reactor comprising introducing polymerization retarder as a function of the rate of increase of a temperature monitored in said reactor. One or more conditions may be prescribed in a computer model. By the maturation of an upset, we mean attainment of conditions whereby an upset is imminent and highly likely to be unavoidable without intervention.

DETAILED DESCRIPTION OF THE INVENTION

The polymerization retarder action can be initiated based on one or several process measurements or inferred event(s) and the a-priori (experiential) knowledge of the ability of the process to return to normal operation. The initiation of the retarder system can be based on a single event or a combination of events and can be dynamically responsive thereto. The amount of polymerization retarder introduced to the reaction system is dependent on (1) the degree of deviation of the monitored process variable(s) from its (their) normal condition(s), (2) the ability of the process to return to prespecified operation, and (3) the predicted effects of the retarder on the polymerization rate, taking into account current conditions as far as practicable. By a prespecified condition, we mean the acceptable level or range of a condition taking into account at least one other variable for the polymerization system; the acceptable level or range of temperature, for example, may change more or less continuously with one or more other variables. The other variables may be (a) batch variables, such as monomer identity, catalyst identity, prescribed product withdrawal cycles, cooling capacity, and reactor size or (b) monitored variables, such as superficial gas velocity, pressures at various points in the reactor, static measurements, and temperatures at particular points in the reactor.

As indicated above, the basic process comprises (1) detecting and quantifying the event(s), or the symptoms thereof, likely to lead to an undesired upset in the continually changing context of the process (2) determining the amount and duration of the retardant flow required to bring the process within predetermined operating parameters and (3) initiating the prescribed polymerization retarder feed with a predetermined termination point. This sequence is shown in FIG. 1.

Figure 1:
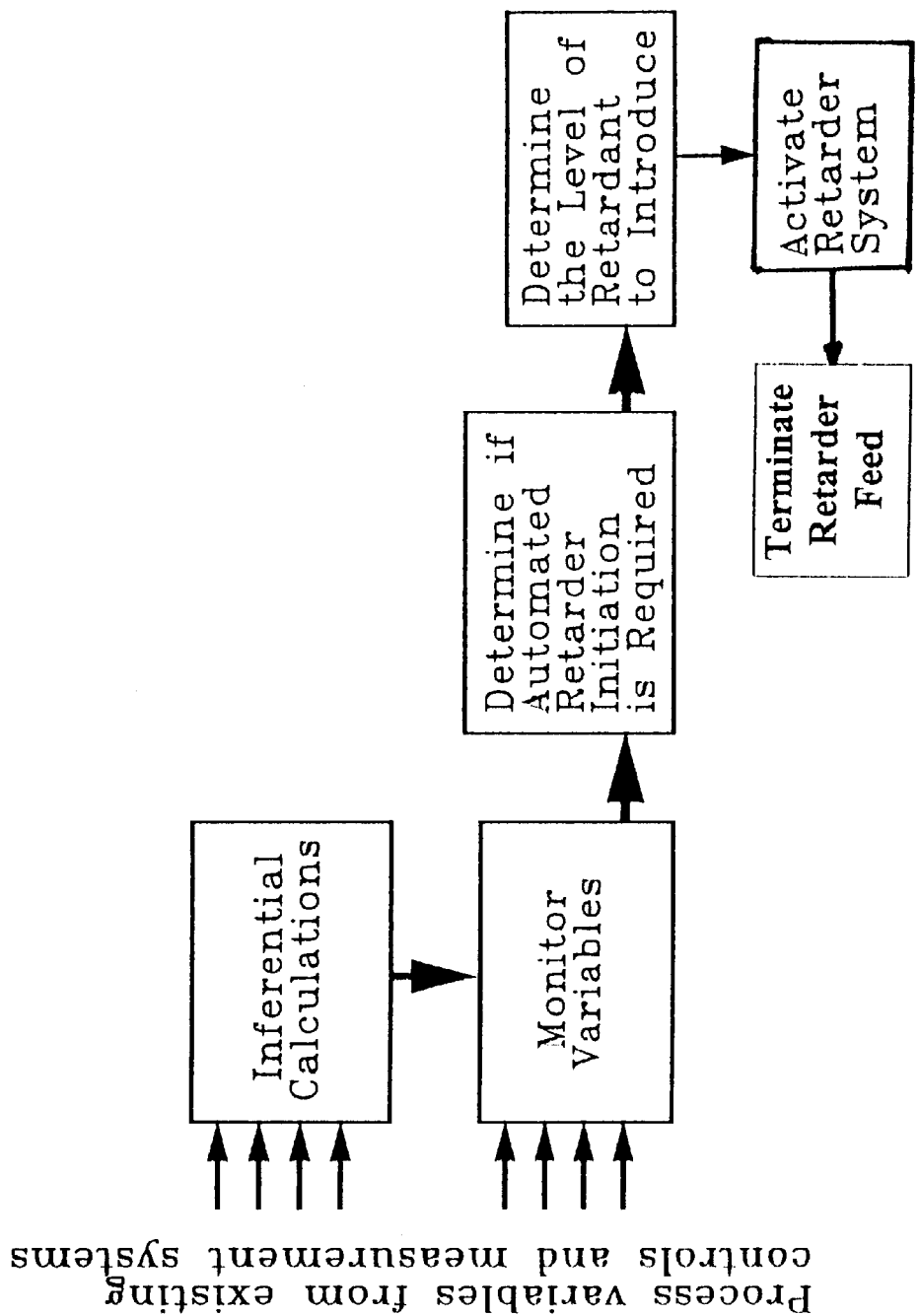
FIG. 1 is a logic diagram for our automated reaction retarder system.

FIG. 1 is a logic diagram or flow sheet showing the basics of the process. Process variables are monitored continuously, periodically or intermittently and signals representing them are fed to a computer or advanced control system which may perform inferential calculations based on a model of the process including permissible and interrelated limits for each of the variables monitored. Our invention optionally includes a significant role for the rate of change of any of the monitored variables, as the rate of change may be a factor in distinguishing a harbinger of an incipient upset from a routine variation in a monitored value. An initial decision is reached whether to begin feeding polymerization retarding agent. If the answer is negative, an additional such decision may again be made within a very short time. If the answer is positive, a further decision is reached as to the amount and duration of the polymerization retardant addition, again based on knowledge of the effects on the reaction, degree of deviation, and process of the introduction of retarding agent. A knowledge of the rate of response of the reaction to the introduction of retarding agent may dictate that the amount should follow a curve rather than comprise a steady rate of introduction for a period of time; likewise, the prescribed duration of the feed of retarder may be modified as the input variables are continuously monitored and delivered to the computer.

The process variables which are used to detect and analyze the suspect events are typically temperatures but can include other process variables such as electrostatic charge, condensing levels, and resin flowability to name a few. Examples of events include:

Abnormal reactor bed temperature deviation from set point and/or sintering temperature;

Abnormal rate of change of the reactor bed temperature,

Abnormal use of cooling capacity in the recycle stream relative to the process limits as an indication of excessive overall exotherm;

Abnormal rate of increase in electrostatic charge;

Abnormal resin flowability and fluidization properties;

Abnormal proximity to the sintering temperature of the fluidized polymer bed, which may vary with other conditions, as reflected in the model;

A high reactor bed temperature deviation from set point together with a high rate of change of the reactor bed temperature, contemporaneously with inadequate available cooling capacity.

The activity retarder may be selected from a wide variety of products which are preferably gases or volatile liquids under polymerization conditions and are capable of reducing the polymerization rate of an alpha-olefin in the presence of a catalyst based on a transition metal. The activity retarder can be selected especially from polymerization inhibitors or from the poisons known for this type of reaction. Activity retarders which can be selected in particular are carbon monoxide, carbon dioxide, carbon disulphide, carbon oxysulphide, nitrogen oxides and peroxides, oxygen, alcohols, aldehydes, ketones, thiols and water. The activity retarder can also be selected from electron donor compounds capable of complexing the catalyst and reducing the polymerization rate, in particular from organic compounds containing at least one oxygen, sulphur, nitrogen and/or phosphorus atom. It can be selected from a wide variety of electron donor compounds such as amines, amides, phosphines, sulphoxides, sulphones, esters, ethers or thioethers. We prefer to use carbon dioxide, but it should be understood that we may use any agent which is capable of retarding polymerization in the system without causing detrimental side effects.

While the retarder dosage or feed is normally a straightforward calculation based on a need to reduce the heat generation rate by a certain amount, our invention also contemplates the use of an uncertainty bias for this calculation. The bias is a factor introduced to the final calculation of retarder feed rate and/or duration which may increase either the amount or its duration, or both, from the otherwise calculated value as a function of the degree of uncertainty of its projected effect under the particular circumstances, in order to force reactor operation to within the desired limits even though the nature and potential course of an upset may not be fully understood. The uncertainty factor may be implicit in that one or more values may be used in the calculations as ranges of values rather than precise terms. The degree of uncertainty accorded to a measured deviation of the ratio of monomer to catalyst, for example, may be less that accorded to a suddenly misbehaving pump in the recycle system. Use of the uncertainty factor also contemplates a possible overshoot of a target for the variable or variables involved, and contemplates a possible later corrective action. A possible later corrective action may be a change in catalyst feed rate, for example.

After initiation of the addition of the prescribed quantity of polymerization retardant, the process further includes a projected termination of the addition of retardant, and may also include the further optional steps of monitoring the effects of the corrective action as it proceeds, modifying the corrective action (retarder feed) to maintain prescribed operating conditions as the system reacts to the presence of retarder, modifying the projected termination of the retarder feed as determined at least partly by current inputs and adjusting one or more process variables to compensate for long term effects of the presence of the retarder in the reactor and/or the reduced polymerization rate already effected. The process is therefore a dynamic one, taking into account current and/or substantially instantaneous changes in conditions in the process system.

The examples described below are examples of single and multiple events initiating the retarder action system.

EXAMPLE 1

Figure 2:
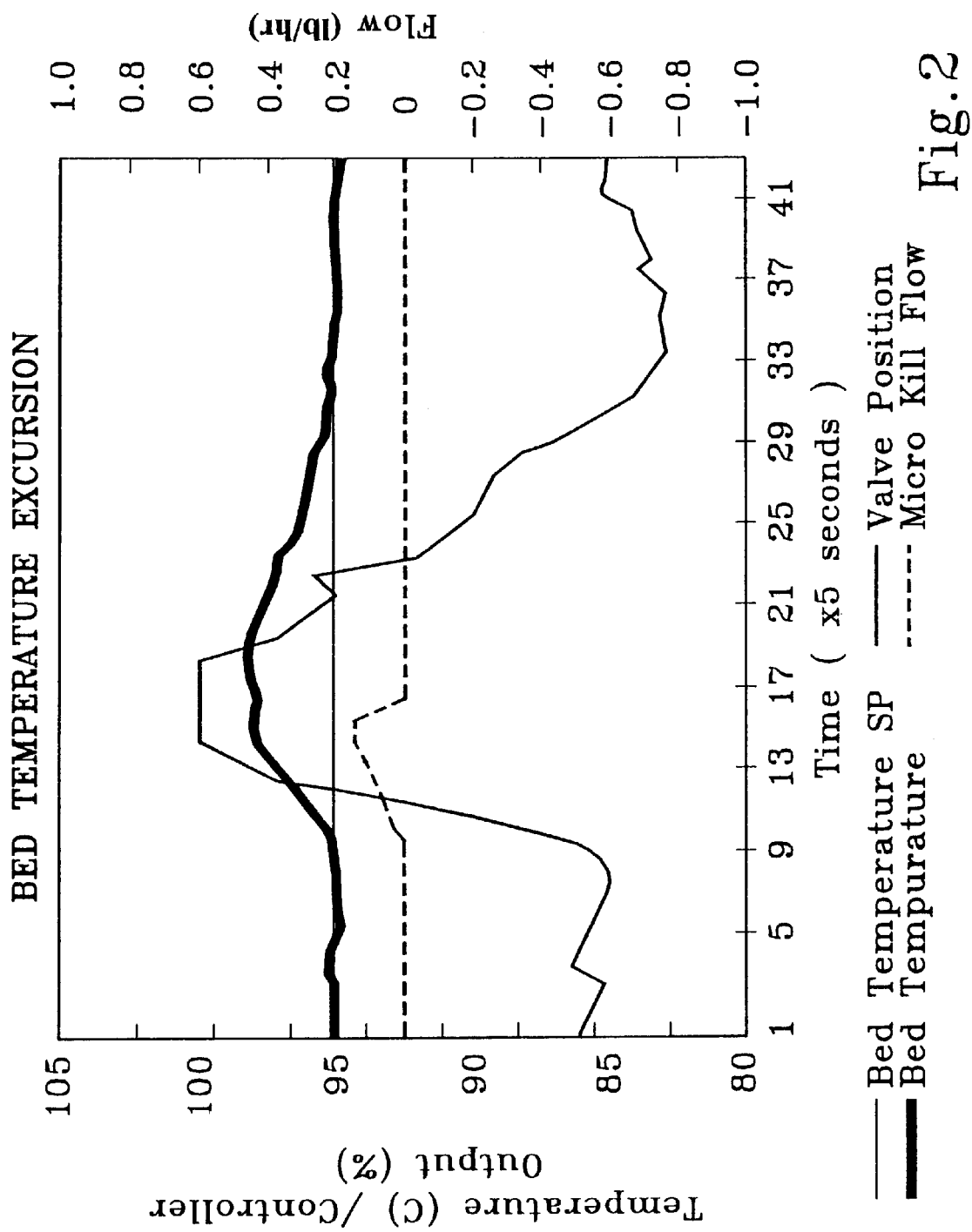
FIG. 2 is a plot of a fluidized bed temperature excursion and action taken within our invention to minimize the extent of the excursion.

FIG. 2 illustrates a typical example of circumstances under which the automated retarder action system would be used. In a fluidized bed olefin polymerization system, this example suggests an impending process disruption detectable via the reactor bed temperature deviation from the control set point, the rate of increase of the reactor bed temperature, and the water valve position. The computer model predicts that the cooling system is incapable of returning the process to the normal operating conditions without intervention—that is, the recycle cooling system is very near its limit and the process is still generating excess exotherm. In this case, the incipient upset was anticipated and suppressed via the following pre-configured steps:

STEP 1—Detect and Quantify the Abnormal Event $$W=A*(Tr-Tsp)+C*(dTr/dt)$$

Where Tr=the reaction temperature
  Tsp=the reaction temperature set point temperature
  dTr/dt=the time derivative of the reaction temperature
    A=a weighting parameter, chosen as 3.0
    C=a weighting parameter, chosen as 0.2
  If (W>B) and V>D), then activate the retarder system.
  Where: B=a threshold value, chosen as 2.0
    D=a threshold value, chosen as 90.
    V=the cooling water valve open signal, which ranges from 0 to 100.

STEP 2—Determine the Amount and Pattern of Retarder Feed.

The retarder system is normally inactive, and therefore feeding no retarder. When the retarder system was activated based on the above criteria, then the retarder feed was calculated as:

Fco=Fmax, selected as 0.15 lb/.hr.
  Tco=W*0.017/Fmax
  Where: Fco=the retarder flow rate
    Fmax=the maximum permissible retarder flow rate, as set by the user and equipment configurations.
    Tco=the time to which the retarder is fed at a rate of Fco STEP 3—Initiate Operation of the Retarder System so as to Provide Retarder According to the Amount and Pattern Indicated in Step 2.

STEP 4—Perform Pre-specified Post Retarder Firing Steps.

In this example, the steps include suspending further retarder feed flow for 6 minutes, and reduction of catalyst feed by 10%.

Based on these conditions (monitored temperature, rate of temperature increase, and monitored water valve position) a retarder flow of 0.15 pph for 25 seconds is prescribed. This example illustrates the combination of two events - an increase of reactor temperature coupled with a notable rate of increase of reactor temperature beyond a permissible limit, and reaching the maximum cooling capacity on the recycle—resulting in the automated retarder system initiation. It should be observed that the acceptable temperature rate of increase of the temperature could be different depending on inputs relating to the original batch conditions such as monomer identity and/or catalyst identity, or relating to monitored conditions such as pressures and percent recycle in the condensing mode. Note that the ratio of weighting factors A and C is 15:1. The ratio in any given case is selected by the user to provide greater or less sensitivity to one factor or another depending on the particular system.

EXAMPLE 2

Figure 3:
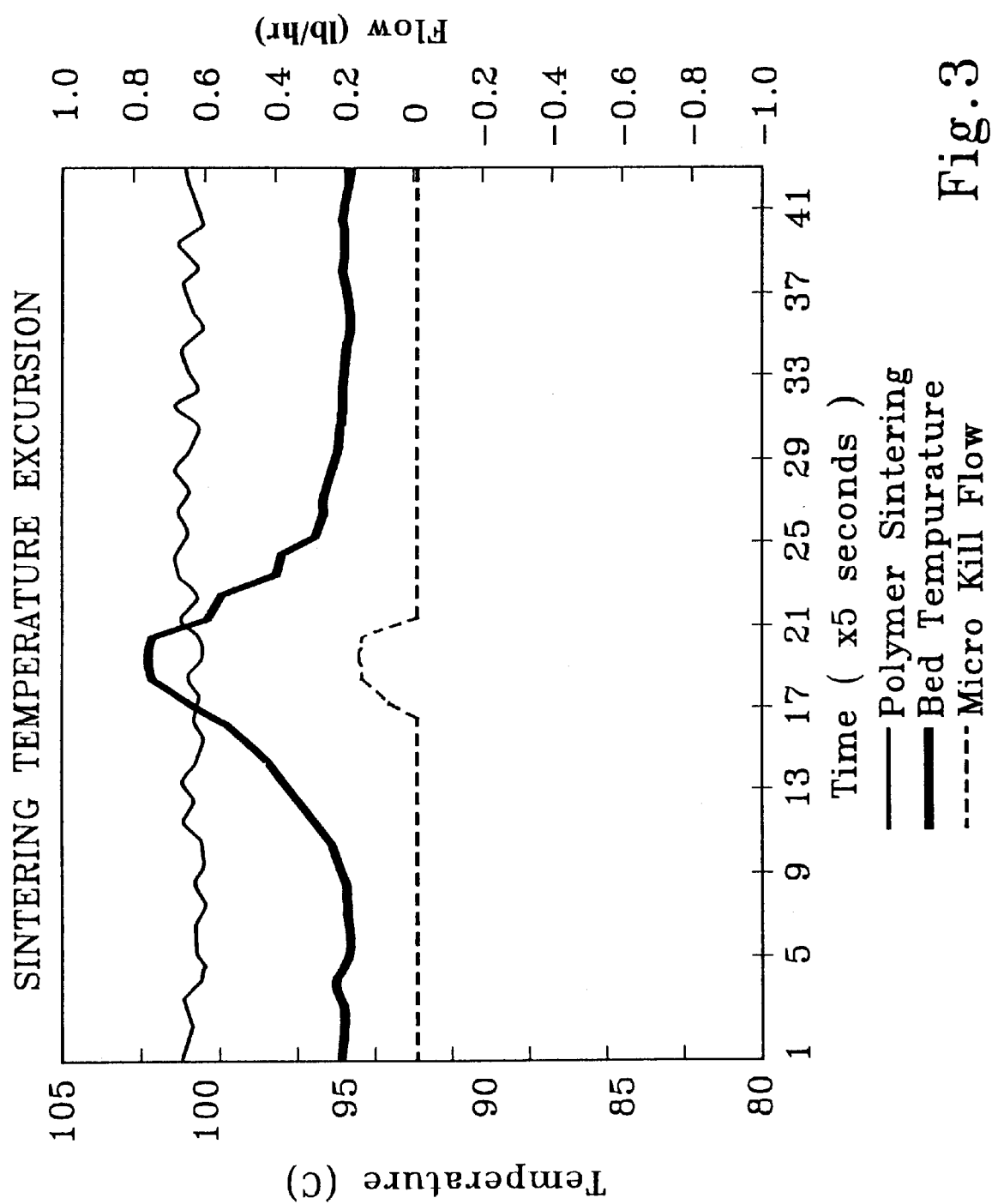
FIG. 3 plots a temperature increase approaching the sintering temperature of the product in the fluidized bed and the action taken within our invention to reduce the degree of excursion to prevent an upset.

FIG. 3 illustrates a temperature increase above the sintering temperature of the fluidized bed. The sintering temperature of the suspended resin product is an inferred variable based on the inferred resin properties and is seen to vary with one or more monitored process operating conditions (not detailed in FIG. 3) throughout the time period presented. At about 45 seconds, as presented, bed temperature begins to rise for an unknown reason and, at about the point at which it reaches the sintering temperature, the retarder system action is initiated by the following preselected steps:

Step 1- Detect and Quantify the Abnormal Event $$W=A*(Tr-Tsinter-B)$$

Where: Tr=Reaction temperature (deg. C)
Tsinter=Inferred resin sintering temperature (deg. C)
A=0.11 (pre-specified parameter)
B=2° C.

Step 2—Determine the Rate of Retarder Feed for the Current Sample Interval

If W is less than or equal to zero, then Feed=0
If W is greater than zero, then Feed=W Step 3—Set the Retarder Flow Until the Next Execution of the Steps at the Rate Indicated in Step 2

Return to Step 1

Note that these steps were executed every 5 seconds, and that no post retarder firing step is specified in this example. Also, the 'B' parameter relates the current reactor set point to the sintering temperature as specified by the user.

On termination of the feed, the polymerization rate has been retarded sufficiently that the bed temperature declines and soon returns to about 95° C. This example illustrates a single event initiating the automated retarder system. If the retarder system had not been initiated, agglomeration would have begun and soon would have been out of control.

EXAMPLE 3

Figure 4:
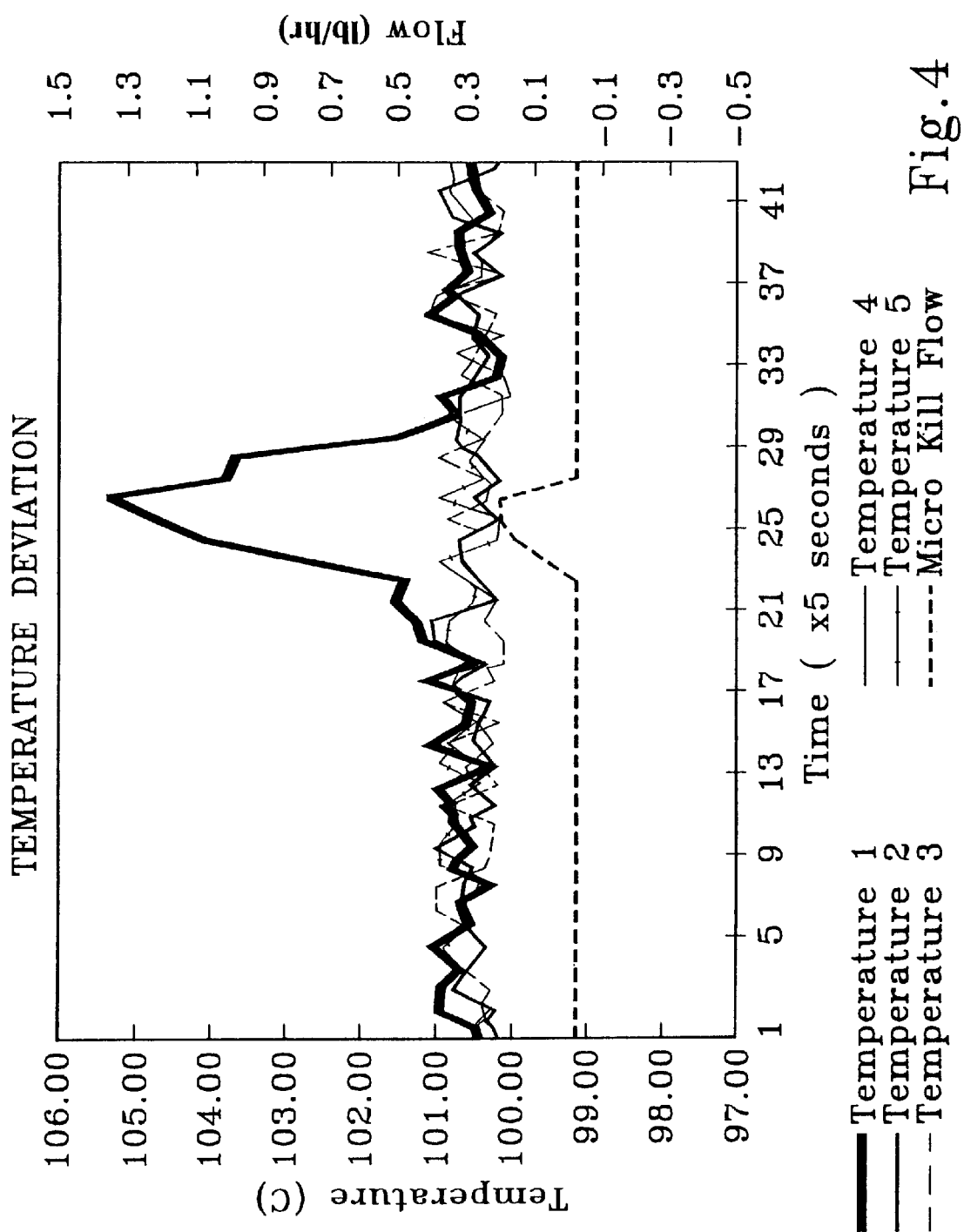
FIG. 4 provides some details of a plurality of events dictating the initiation of the retarding action of the present invention.

FIG. 4 exemplifies a condition of several events resulting in the initiation of the automated retarder system. Several temperatures are measured in close proximity within the fluidized bed. During this episode, a single temperature is observed to increase from its baseline and deviate from the other measured temperatures. Often such a temperature excursion is due to poor fluidization and a localized "hot spot" in the fluidized bed. To prevent reactor down time, the initiation of the automated reactor retarder system is used to reduce the temperature excursion. Based on these conditions a retarder flow of 0.2 pph for 20 seconds is prescribed. It will be observed that the invention was able to prescribe the retarder feed well in advance of the peak exotherm of "Temperature 1", and that the prescription terminated the retarder feed while Temperature 1 was still considerably above the norm. These abilities are made possible by the use of process models, as described elsewhere.

Thus it is seen that our invention also comprises a method of controlling upsets in a polymerization process comprising constructing a computer model of the polymerization process including the interrelationship of at least two variables A and B, variable B being a harbinger of an upset under at least some values of variable A, and, during the practice of the process (a) monitoring at least the two interrelated variables A and B in the process and (b) when variable B exceeds a value which is predetermined to be a critical level when variable A is at its then current value, feeding a polymerization retarder to the reactor.

Since the automated retarder system can require complex calculations and timely process measurements, the best practice would utilize a process computer or modern control system with capability for user specified real time algorithm calculations.

What is claimed is:

1. A method of inhibiting the maturation of incipient upsets in a polymerization reaction system making a particulate polyolefin resin product in the presence of a polymerization catalyst, comprising (a) continuously, periodically or intermittently monitoring at least one condition in said system, said condition being useful as a harbinger of an incipient upset (b) continuously, periodically or intermittently comparing said monitored condition to a critical level thereof for the manufacture of said resin product beyond which an upset is likely, said critical level being determined continuously, periodically or intermittently by a model based on knowledge of said polymerization reaction system (c) upon determining that said condition exceeds said critical level, determining an amount and duration therefore for feeding retarding agent to said reaction system for said catalyst to return said condition to below said critical level, and (d) delivering said retarding agent into said reactor.

2. Method of claim 1 wherein said retarding agent is carbon dioxide.

3. Method of claim 1 followed by reducing the level of catalyst feed at least two percent below its level at the beginning of step (c).

4. Method of claim 1 wherein said dosage determination in step (c) is in part a function of an uncertainty factor.

5. Method of claim 1 wherein said monitored condition is a temperature and said critical level thereof is based, in addition to said model, upon at least one monitored variable other than said monitored temperature.

6. Method of claim 5 wherein said computer model includes at least a factor representing the sintering temperature of said particulate resin product.

7. Method of claim 6 wherein said sintering temperature is continuously recalculated by said computer based at least partly upon said variable other than said monitored temperature.

8. Method of claim 5 followed by (e) continuously, periodically or intermittently monitoring temperature in at least two points in said reactor and (f) modifying at least one process variable other than retarder feed to compensate for the presence of the retarder in the reactor.

9. Method of claim 5 including calculating the rate of change of said temperature and respecifying said critical level at least partly as a function of said rate of change.

10. Method of claim 1 wherein said model includes as factors at least two of reaction temperature, electrostatic charge, resin flowability and catalyst activity.

11. Method of inhibiting an imminent upset in a fluidized bed olefin polymerization reactor comprising introducing polymerization retarder as a function of the rate of increase of a temperature monitored in said reactor.

12. Method of claim 11 wherein said polymerization retarder is carbon dioxide.

13. Method of claim 11 followed by monitoring the effects of the introduction of said retarder as it proceed;, modifying retarder feed to maintain prescribed operating conditions as the system reacts to the presence of retarder, terminating the retarder feed, and adjusting one or more process variables to compensate for the presence of the retarder in the reactor.

14. Method of controlling upsets in a polymerization process comprising constructing a computer model of said polymerization process including the interrelationship of at least two variables A and B, variable B being a harbinger of an upset under at least some values of variable A, and, during the practice of said process (a) monitoring at least said two interrelated variables A and B in said process and (b) when said variable B exceeds a value which is predetermined to be a critical level when variable A is at its then current value, feeding a polymerization retarder to said process.

15. Method of claim 14 wherein the amount and duration of polymerization retarder feed in step (b) is less than an amount which would kill said process.

16. Method of claim 15 wherein said amount and duration includes an uncertainty factor.

17. Method of claim 14 wherein said polymerization retarder is carbon dioxide.

18. Method of claim 14 wherein variable B is a temperature.

19. Method of claim 14 wherein variable B is a rate of increase of a temperature.

20. Method of claim 14 wherein said variable B is a function of available cooling capacity.

* * * * *